United States Patent
Neumann

(10) Patent No.: US 6,997,494 B2
(45) Date of Patent: Feb. 14, 2006

(54) ARMREST COMPRISING A PIVOTABLE SCREEN

(75) Inventor: Michael Neumann, Gevelsberg (DE)

(73) Assignee: Johnson Controls GmbH, Burscheid (DE)

( * ) Notice: Subject to any disclaimer, the term of this patent is extended or adjusted under 35 U.S.C. 154(b) by 120 days.

(21) Appl. No.: 10/498,717

(22) PCT Filed: Dec. 13, 2002

(86) PCT No.: PCT/EP02/14199

§ 371 (c)(1),
(2), (4) Date: Jun. 14, 2004

(87) PCT Pub. No.: WO03/051665

PCT Pub. Date: Jun. 26, 2003

(65) Prior Publication Data

US 2005/0082858 A1 Apr. 21, 2005

(30) Foreign Application Priority Data

Dec. 14, 2001 (DE) .......................... 101 61 663

(51) Int. Cl.
B60R 11/02 (2006.01)

(52) U.S. Cl. .................... 296/1.09; 296/24.46; 248/917

(58) Field of Classification Search ............... 296/1.09, 296/37.8, 37.14–37.16, 24.33, 24.34, 24.46; 297/411.21, 411.3–411.34, 411.45; 248/917, 248/919–923
See application file for complete search history.

(56) References Cited

U.S. PATENT DOCUMENTS

| | | | |
|---|---|---|---|
| 5,207,471 A | | 5/1993 | Mutschler et al. |
| 5,709,360 A | * | 1/1998 | Rosen ..................... 248/278.1 |
| 6,246,449 B1 | | 6/2001 | Rosen |
| 6,278,676 B1 | | 8/2001 | Anderson et al. |
| 6,279,977 B1 | * | 8/2001 | Chen ........................ 296/24.34 |
| 6,305,973 B1 | * | 10/2001 | Rosen ......................... 439/534 |
| 6,494,527 B1 | | 12/2002 | Bischoff |
| 6,663,155 B1 | * | 12/2003 | Malone et al. ............. 296/37.8 |
| 6,719,343 B1 | * | 4/2004 | Emerling et al. ........ 296/24.34 |
| 6,746,065 B1 | * | 6/2004 | Chan ....................... 296/24.34 |

FOREIGN PATENT DOCUMENTS

| | | |
|---|---|---|
| DE | 3719105 A1 | 12/1988 |
| DE | 19609408 A1 | 9/1997 |
| DE | 19700515 A1 | 7/1998 |
| DE | 19754224 A1 | 6/1999 |
| DE | 19931154 A1 | 1/2001 |
| DE | 19938690 A1 | 2/2001 |
| DE | 10161663 A1 | 6/2003 |
| FR | 2805225 B1 | 8/2001 |
| JP | 63242751 A | 10/1988 |
| JP | 02249734 A | 10/1990 |

(Continued)

OTHER PUBLICATIONS

International Search Report for WO 03/047912; International Application No. PCT/EP 02/13648; dated Jun. 2, /2003; 3 pgs.
International Search Reportfor WO 03/051665, International Application No. PCT/EP 02/14199 mailed Mar. 31, 2003, 3 pages.

*Primary Examiner*—Dennis H. Pedder
*Assistant Examiner*—Greg Blankenship
(74) *Attorney, Agent, or Firm*—Foley & Lardner LLP

(57) ABSTRACT

An arm rest, in particular for a vehicle seat (2), is provided with a viewing screen (12) which can be swung up from a non-functional position into a functional position, the arm rest (1) having a rotatable first arm support (6) at whose free end the viewing screen is arranged pivotably. In this case, a second arm support (13) is provided, which arm support can be rotated in relation to the first arm support (6) and, in the non-functional position of the viewing screen (12), can be concealed by the first arm support.

16 Claims, 3 Drawing Sheets

FOREIGN PATENT DOCUMENTS

| | | |
|---|---|---|
| JP | 04095543 A | 3/1992 |
| JP | 04154452 A | 5/1992 |
| JP | 07195962 A | 8/1995 |
| JP | 08009291 A | 1/1996 |
| JP | 2001322503 A | 11/2001 |
| WO | WO 99/65734 A1 | 12/1999 |
| WO | WO 03/047912 A2 | 6/2003 |

* cited by examiner

ARMREST COMPRISING A PIVOTABLE SCREEN

FIELD

The invention relates to an arm rest, in particular for a vehicle seat, having a viewing screen which can be swung up from a non-functional position into a functional position, the arm rest having a rotatable first arm support at whose free end the viewing screen is arranged pivotably.

BACKGROUND

An arm rest of the generic type is disclosed in the laid-open specification DE 199 31 154 A1. This arm rest is designed as a central arm rest of a rear seat bench and can be pivoted forward out of the recess in the backrest into a horizontal position and rests on the padding of the seat part. A viewing screen is arranged rotatably in the front region of the arm rest and, in the non-functional position, the rear side of said viewing screen form parts of the supporting surface. The viewing screen can be transferred out of the arm rest by pivoting about a horizontal pivot axis (Y-axis of the vehicle), which runs transversely with respect to the direction of travel, into a functional position in which the display can be seen from the rear seat.

This arrangement has various disadvantages. Firstly, the viewing screen in the functional position can be observed only at a relatively obtuse angle, which means that the rear occupant has to considerably turn his head to the side. This body posture is tiring over a long period. Furthermore, the surface of the arm rest which can be used as an arm support is considerably reduced in size after the viewing screen is pivoted out, with, in particular, the front region, as seen in the direction of travel, no longer being available. In practice, the arm rest can therefore scarcely continue to be used as such.

SUMMARY

The invention is based on the object of providing an arm rest with an ergonomic functional position for the viewing screen, it furthermore also being possible for the arm rest to be used in this position as arm support.

The object is achieved according to the invention by the fact that, in the case of an arm rest of the generic type, a second arm support is provided, which can be rotated in relation to the first arm support and, in the non-functional position of the viewing screen, can be concealed by the first arm support.

In this case, the second arm support can preferably be rotated about the same axis of rotation as the first arm support, so that a common joint can be provided for both arm supports.

The viewing screen in the non-functional position can advantageously be pivoted under the second arm support and therefore protected against damage.

According to one particular development of the invention, the second arm support in the functional position of the viewing screen can be brought into the same position as in the non-functional position of the viewing screen and provides the vehicle occupant with a support surface which is only negligibly reduced in size.

BRIEF DESCRIPTION OF THE DRAWINGS

The figures illustrate one embodiment of the invention by way of example and schematically.

DESCRIPTION OF THE PREFERRED AND EXEMPLARY EMBODIMENTS

Figure 1:
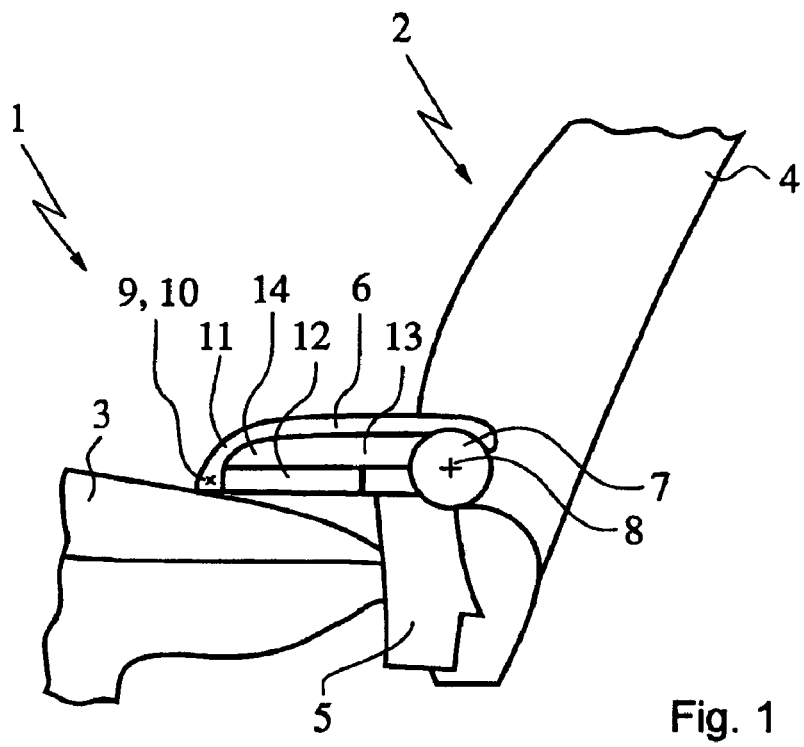
FIG. 1 shows a lateral view of the arm rest according to the invention in the non-functional position of the viewing screen
Figure 2:
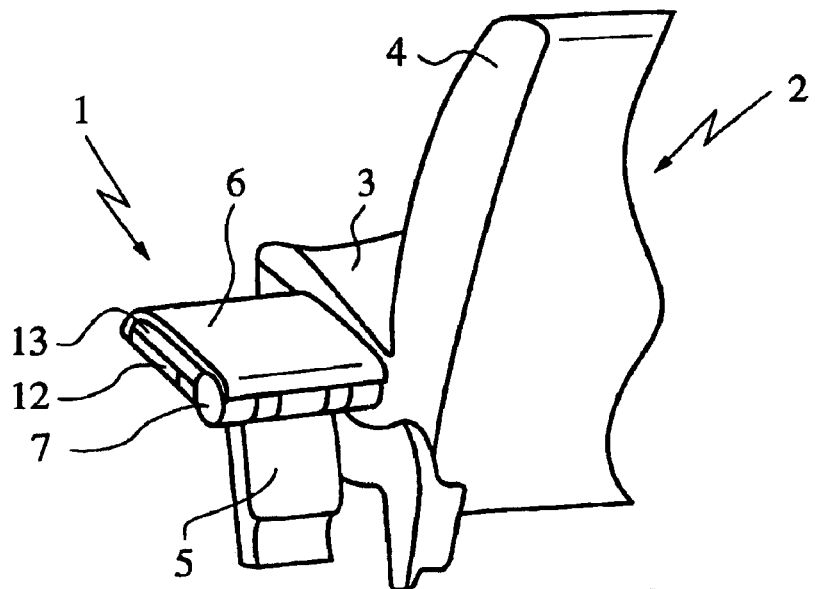
FIG. 2 shows the arm rest in the position according to FIG. 1 in a perspective view as seen by the rear vehicle occupants

The arm rest 1 according to the invention is, as is apparent from FIGS. 1 and 2, arranged at the side of a vehicle seat 2 which has a seat part 3 and a backrest 4. The arm rest is placed onto a central console 5 without necessarily having to be integrated therein, and is therefore suitable in principle also for the retrofitting of a vehicle.

The arm rest 1 comprises a first arm support 6, which is essentially horizontal in the depicted position and can be rotated about a horizontal axis of rotation 8, which runs transversely with respect to the direction of travel, around a joint 7 arranged in a positionally fixed manner with respect to the vehicle interior or in a positionally fixed manner with respect to the seat part 3.

A further joint 9 is situated on the lower edge of that region 11 of the first arm support 6 which is in front, as seen in the direction of travel, and is inclined downward for comfort reasons, the pivot axis 10 of which joint runs axially parallel to the axis of rotation 8 and which joint connects the first arm rest 6 pivotably to a viewing screen 12. The joint 9 is designed in such a manner that the viewing screen 12 can be pivoted into a non-functional position in which it is orientated essentially parallel to the horizontal part of the arm support 6 and is spaced apart therefrom as a consequence of the downwardly inclined region 11. In this case, the display 15 of the viewing screen 12 is directed downward.

A second arm support 13, which can likewise be rotated about the axis of rotation 8 in the joint 7, is arranged in the gap between the first arm support 6 and viewing screen 12. The arm supports 6 and 13 can be moved independently of each other, as long as collisions do not occur between them, and can be locked in the joint 7. The second arm support 13, in the position illustrated, is also orientated essentially horizontally and rounded in a manner such that it drops forward at its front end 14.

In this position, the viewing screen 12 can naturally not be seen from the rear seats (FIG. 2) and is protected against mechanical damage.

Figure 3:
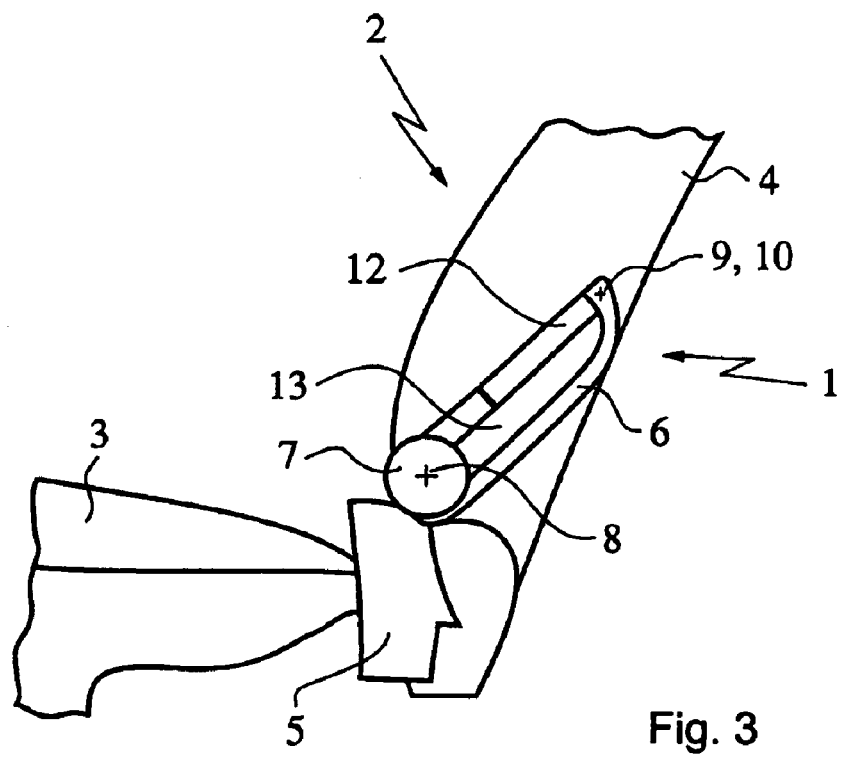
FIG. 3 shows the first phase of the pivoting out of the viewing screen, in a lateral view
Figure 4:
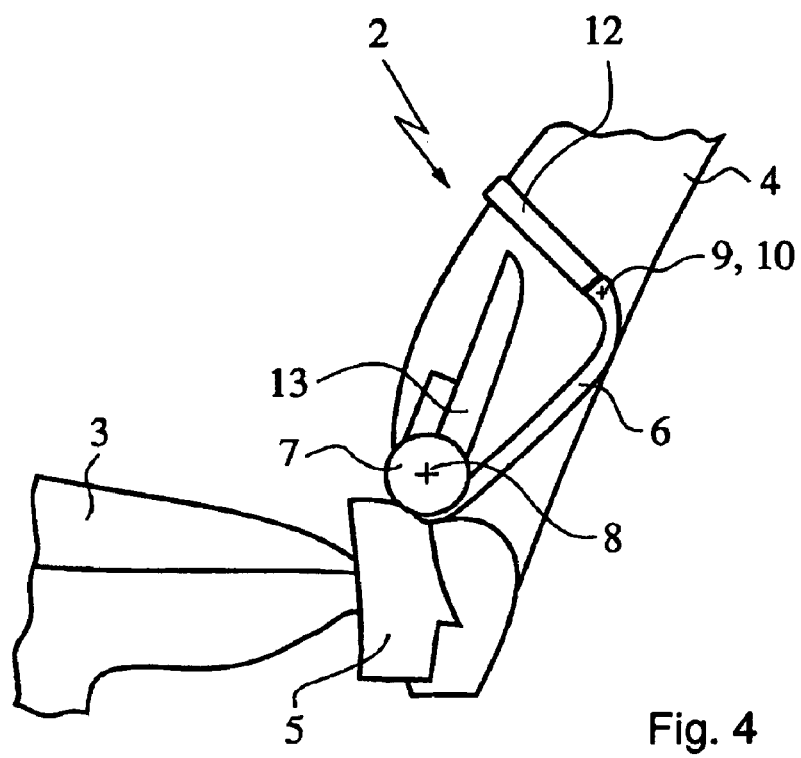
FIG. 4 shows a subsequent phase of the pivoting-out operation

During the transfer of the viewing screen 12 into the functional position, first of all the assembly comprising the arm supports 6, 13 and the viewing screen 12 is rotated as a whole about the axis of rotation 8 into an upright position (FIG. 3). The viewing screen 12 is then pivoted about the pivot axis 10 until the display 15 is orientated approximately tangentially to the inclined region 11 of the first arm support 6 and is fixed in this position by locking of the joint 9. Similarly, the first arm support 6 is locked in the joint 7 (FIG.

Figure 5:
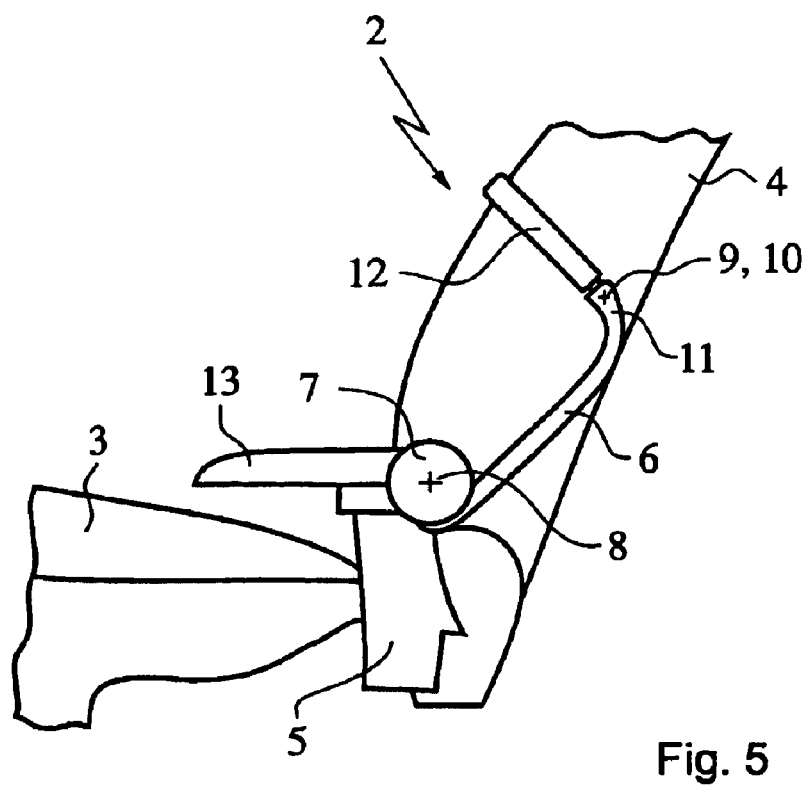
FIG. 5 shows a lateral view of the arm rest according to the invention in the functional position of the viewing screen
Figure 6:
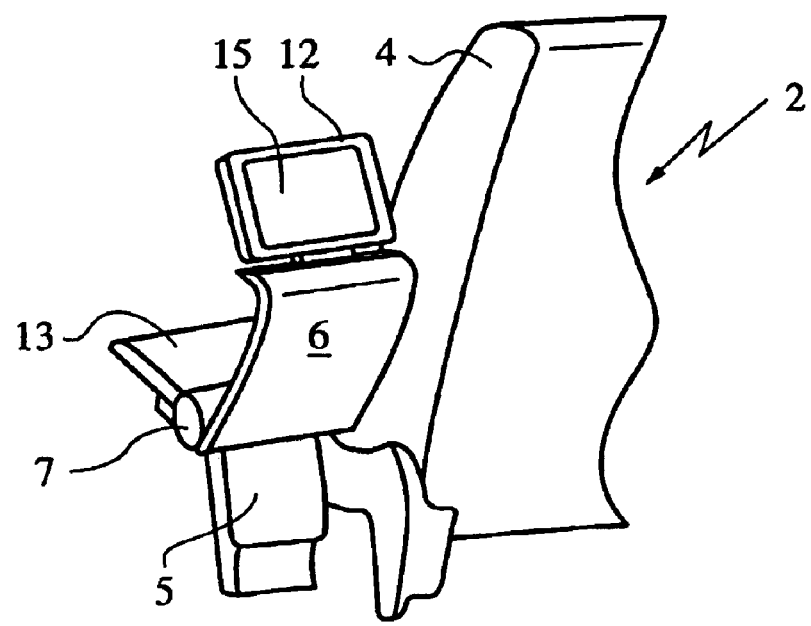
FIG. 6 shows the arm rest in the position according to FIG. 5 in a perspective view as seen by the rear vehicle occupants

4). The second arm support 13 can subsequently be rotated back in the joint 7 into the starting position and provides the occupant of the vehicle seat 2 with a supporting surface which although slightly reduced in size is nevertheless comfortable (FIG. 5). The occupants of the rear seats can now comfortably see the display 15 in the functional position of the viewing screen 12 (FIG. 6).

The transfer of the viewing screen 12 from the functional position into the non-functional position takes place correspondingly in the reverse sequence.

REFERENCE NUMBERS

1 Arm rest
2 Vehicle seat
3 Seat part
4 Backrest
5 Central console
6 Arm support
7 Joint
8 Axis of rotation
9 Joint
10 Pivot axis
11 Inclined region
12 Viewing screen
13 Arm support
14 Front end
15 Display

What is claimed is:

1. An arm rest for a vehicle comprising:
   a viewing screen which can be moved between a first position and a second position;
   a first arm support having a first end and a second end, the viewing screen being coupled to the first end, the first arm being rotatable between a first position and a second position;
   a second arm support rotatable relative to the first arm support between a first position and a second position and concealable by the first arm support when the viewing screen is in the second position;
   wherein the first arm support provides a first armrest surface when in the first position and the second arm support provides a second armrest surface when the first arm support is in the second position and the second arm support is in the first position.

2. The arm rest of claim 1 wherein the first position of the viewing screen is a non-functional position and the second position of the viewing screen is a functional position.

3. The arm rest of claim 2 wherein the second arm support is rotated about the same axis of rotation as the first arm support.

4. The arm rest of claim 3 wherein the viewing screen in the non-functional position can be rotated under the second arm support.

5. The arm rest of claim 4 wherein the second arm support in the functional position of the viewing screen can be brought into the same position as in the non-functional position of the viewing screen.

6. The arm rest of claim 2 wherein the viewing screen in the non-functional position is generally parallel to the first arm support.

7. The arm rest of claim 1 wherein the first arm support and the second arm support are movable independent of each other.

8. The arm rest of claim 1 wherein:
   the viewing screen is rotatable between the first position and the second position about a first axis;
   the first arm support is rotatable between the first position and the second position about a second axis;
   the second arm support is rotatable between the first position and the second position about a third axis;
   wherein the first axis, second axis, and third axis are generally parallel to each other.

9. The arm rest of claim 8 wherein the first arm support and the second arm support share a common joint so that the second axis and the third axis are generally co-linear.

10. The arm rest of claim 1 wherein the first position of the first arm support and the first position of the second arm support are lowered positions, and the second position of the first arm support and the second position of the second arm support are raised positions.

11. An arm rest for a vehicle comprising:
    a viewing screen which can be moved between a first position and a second position;
    a rotatable first arm support having a first end coupled to the viewing screen;
    a second arm support rotatable relative to the first arm support and concealable by the first arm support when the viewing screen is in the second position;
    wherein the first position is a non-functional position and the second position is a functional position;
    wherein the second arm support is rotated about the same axis of rotation as the first arm support;
    wherein the viewing screen in the non-functional position can be rotated under the second arm support.

12. An arm rest for a vehicle comprising:
    a viewing screen which can be moved between a first position and a second position;
    a first arm support rotatable about a first axis and having a first end coupled to the viewing screen;
    a second arm support rotatable about the first axis and relative to the first arm support, the second arm support being concealable by the first arm support when the viewing screen is in the second position;
    wherein the first arm support and the second arm support are movable independent of each other;
    wherein the viewing screen in the first position can be rotated under the second arm support.

13. The arm rest of claim 12 wherein the viewing screen is rotatable about a second axis spaced apart from the first axis.

14. The arm rest of claim 12 wherein the first arm support provides a first armrest surface when in a lowered position and the second arm support provides a second armrest surface when the first arm support is in a raised position and the first arm support is in a lowered position.

15. The arm rest of claim 12 wherein the second arm support in the second position of the viewing screen can be brought into the same position as in the first position of the viewing screen.

16. The arm rest of claim 12 wherein the viewing screen in the first position is generally parallel to the first arm support.

* * * * *